Nov. 9, 1926.
J. N. FILLION
1,606,354
FLOOR LAMP
Filed May 8, 1925
2 Sheets-Sheet 1
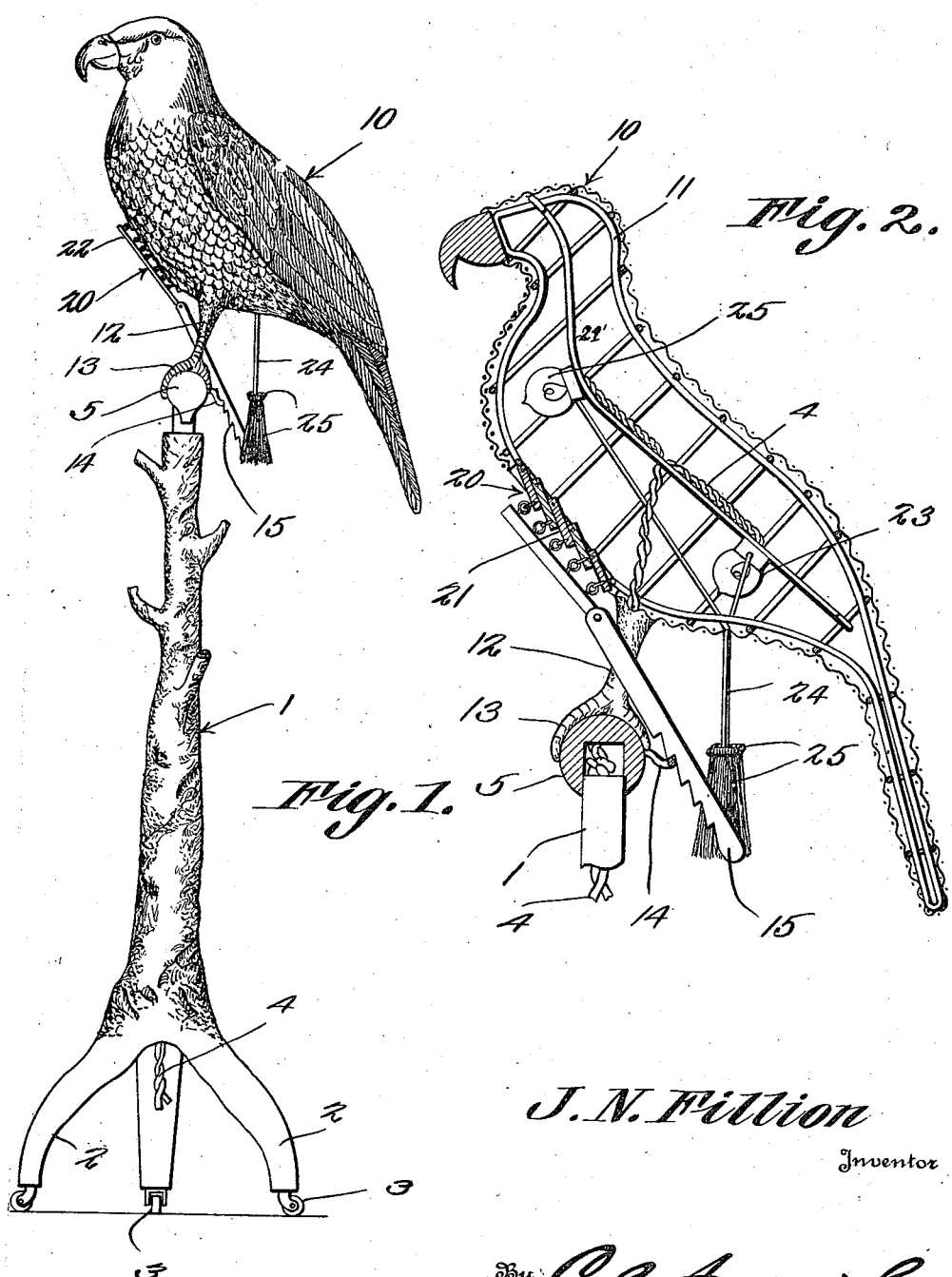
J. N. Fillion
Inventor
By C. A. Snow & Co.
Attorneys.

Nov. 9, 1926.  J. N. FILLION  1,606,354
FLOOR LAMP
Filed May 8, 1925   2 Sheets-Sheet 2

Inventor
J. N. Fillion
By C. A. Snow & Co.
Attorneys.

Patented Nov. 9, 1926.

1,606,354

UNITED STATES PATENT OFFICE.

JOSEPH NOEL FILLION, OF WORCESTER, MASSACHUSETTS.

FLOOR LAMP.

Application filed May 8, 1925. Serial No. 28,932.

This invention relates to electric floor lamps and the object thereof is to provide an ornamental lamp of this character equipped with shutter controlled means for varying the amount of light supplied by the lamp.

Another object is to so arrange this controlled means that it will be inconspicuous and not mar the attractiveness of the lamp.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a lamp constructed in accordance with this invention;

Fig. 2 is a longitudinal vertical section with the stand of the lamp broken off for convenience in illustration;

Figure 3:
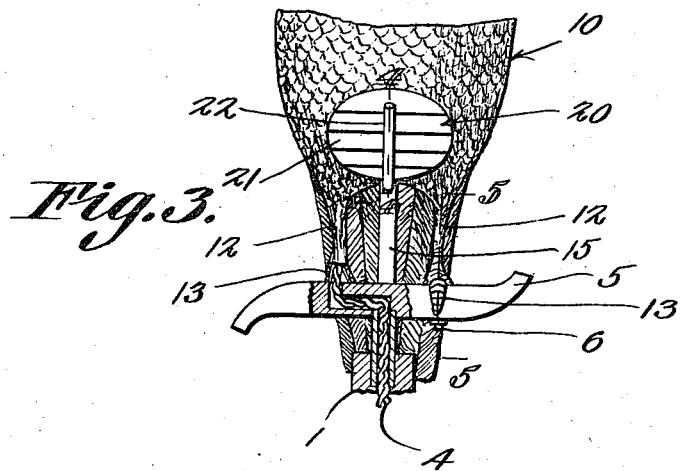
Fig. 3 is a front elevation showing the shutter controlled mechanism for varying the quantity of light supplied.
Figures 4, 5:
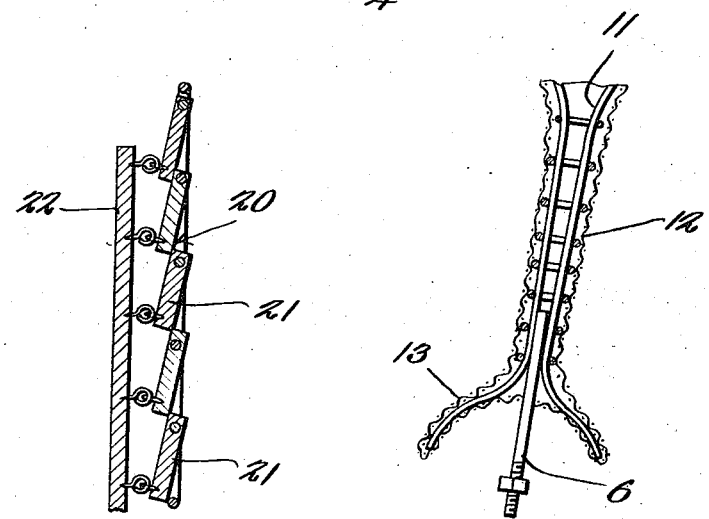
Fig. 4 is a transverse section taken on the line 4—4 of Fig. 3.
Fig. 5 is a detail section taken on the line 5—5 of Fig. 3.

In the embodiment illustrated a supporting stand 1 is shown made in the form of a tree with the branches cut off and having diverging legs 2 at its lower end equipped with casters 3 so that the lamp may be readily moved from place to place. This stand or post 1 is made hollow to receive the conductor cords 4 which supply current to the light. These cords 4 extend through the upper end of the post and enter a perch 5 carried by this stand and on which is mounted the representation of a bird here shown in the form of a parrot. This parrot or bird 10 is made hollow being composed of a wire frame embodying longitudinal wires and circular spaced wires connecting the longitudinal wires, and shaped to represent the bird and has hollow legs 12 with feet 13 grasping the perch 5. The conductor cord 4 passes through one of the legs while a rod or bolt 6 passes through the other and secures the bird to the perch.

A catch member 14 is carried by the perch 5 and a ratchet bar 15 is designed to cooperate therewith for locking a light controlling shutter 20 in adjusted position. The shutter is preferably located between the legs of the bird below the breast thereof where it will be less conspicuous and at which point it will throw the light downwardly at an oblique angle.

This shutter as shown is composed of a plurality of slats 21 connected with a controlling bar 22 which is pivoted to the ratchet bar 15 and which simultaneously opens or closes the slats 21 on the actuation of said ratchet bar. A bulb supporting member indicated at 21' is provided and has one end looped around one of the longitudinal wires at one end of the body, the opposite end being looped around one of the circular wires at the opposite end of the body. Any desired number of electric light bulbs 23 are mounted within the bird 10, two being here shown and these bulbs are controlled by cords 24 which depend into convenient position for operation and are preferably equipped with tassels 25 to render them more ornamental. The switch of each bulb is preferably provided with an operating cord so that each bulb may be controlled individually.

The covering for the frame 11 may be of any desired character being preferably constructed of semi-transparent material of colors representing bright feathers so that when the light bulbs are lit the colors of the bird will be brought out, and produce a soft mellow light.

The opening below the breast of the bird which is controlled by the shutter 20 permits the direct rays of the light to pass therethrough and the volume of such light rays is controlled by the shutter 20 which may be opened to any desired extent and secured in adjusted position by means of the ratchet bar 15 which is engaged with the catch member 14.

From the above description it will be obvious that a lamp constructed as herein shown and described is especially useful for a piano lamp or a reading lamp, the volume of light being controlled as above set forth by means of the ratchet bar 15 for opening and closing the slats of the shutter while the body of the bird presents an attractive appearance and sheds a soft light.

I claim:—

In a lamp construction, a body portion including a plurality of longitudinal wires spaced apart, a plurality of circular wires connected with the first mentioned wires, and arranged in spaced relation, said body portion having a forward cut out portion, a plurality of pivoted slats connected with the body portion, an operating bar connected with the slats, a ratchet bar connected with the operating bar and adapted to move the slats to their open or closed positions, and means cooperating with the ratchet bar for holding the ratchet bar in positions of adjustment.

In testimony that I claim the foregoing as my own, I have hereto affixed my signature.

JOSEPH NOEL FILLION.